(12) United States Patent
Burke, II

(10) Patent No.: US 8,439,086 B2
(45) Date of Patent: *May 14, 2013

(54) TUBULAR STRUCTURE

(75) Inventor: Charles S. Burke, II, Troy, MI (US)

(73) Assignee: Fluid Routing Solutions, Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,258

(22) Filed: Oct. 27, 2011

(65) Prior Publication Data

US 2012/0037257 A1 Feb. 16, 2012

Related U.S. Application Data

(63) Continuation of application No. 12/129,738, filed on May 30, 2008, now Pat. No. 8,091,588.

(51) Int. Cl.
  *F16L 9/14* (2006.01)
(52) U.S. Cl.
  USPC ............ 138/143; 138/140; 138/139; 138/109; 138/173
(58) Field of Classification Search .................. 138/138, 138/139, 143, 109, 172, 173, 121; 285/405
  See application file for complete search history.

(56) References Cited

U.S. PATENT DOCUMENTS

| | | | | |
|---|---|---|---|---|
| 723,135 | A * | 3/1903 | Browne | 464/174 |
| 858,100 | A * | 6/1907 | Pedersen | 285/187 |
| 3,895,177 | A * | 7/1975 | Muslin | 174/669 |
| 4,009,733 | A * | 3/1977 | Schnabel | 138/103 |
| 4,185,844 | A * | 1/1980 | Hubbard et al. | 280/834 |
| 4,388,752 | A * | 6/1983 | Vinciguerra et al. | 29/421.1 |
| 5,253,773 | A * | 10/1993 | Choma et al. | 220/86.2 |
| 5,390,808 | A * | 2/1995 | Choma et al. | 220/86.2 |
| 5,553,640 | A * | 9/1996 | Ferenczy et al. | 138/154 |
| 5,581,862 | A * | 12/1996 | Choma et al. | 29/33 K |
| 5,620,805 | A * | 4/1997 | Ogawa et al. | 428/683 |
| 5,775,378 | A * | 7/1998 | Auvil et al. | 138/143 |
| 5,918,643 | A * | 7/1999 | Roloff et al. | 138/137 |
| 6,474,534 | B2 * | 11/2002 | Gabbianelli et al. | 228/131 |
| 6,668,455 | B2 * | 12/2003 | Duvall et al. | 29/890.141 |
| 6,802,430 | B2 * | 10/2004 | Tomimura et al. | 220/562 |
| 6,824,173 | B2 * | 11/2004 | Usui | 285/353 |
| 6,851,455 | B2 * | 2/2005 | Otsuka et al. | 138/171 |
| 6,989,198 | B2 * | 1/2006 | Masuda et al. | 428/474.9 |
| 7,048,019 | B2 * | 5/2006 | Pacitto et al. | 141/286 |
| 2004/0076783 | A1 * | 4/2004 | Norman et al. | 428/36.91 |
| 2004/0201217 | A1 * | 10/2004 | Mobley et al. | 285/417 |
| 2005/0280259 | A1 * | 12/2005 | Sausner et al. | 285/288.1 |
| 2007/0065616 | A1 * | 3/2007 | Fauble | 428/36.91 |

* cited by examiner

*Primary Examiner* — Patrick F Brinson

(74) *Attorney, Agent, or Firm* — Marshall & Melhorn, LLC

(57) ABSTRACT

A tubular structure having a multi-layer, strength-enhanced first end segment, a multi-layer, strength-enhanced second end segment, and a flexible segment intermediate said multi-layer strength-enhanced first end segment and said multi-layer, strength-enhanced second end segment is provided. Methods for manufacturing tubular structures are also provided.

18 Claims, 2 Drawing Sheets

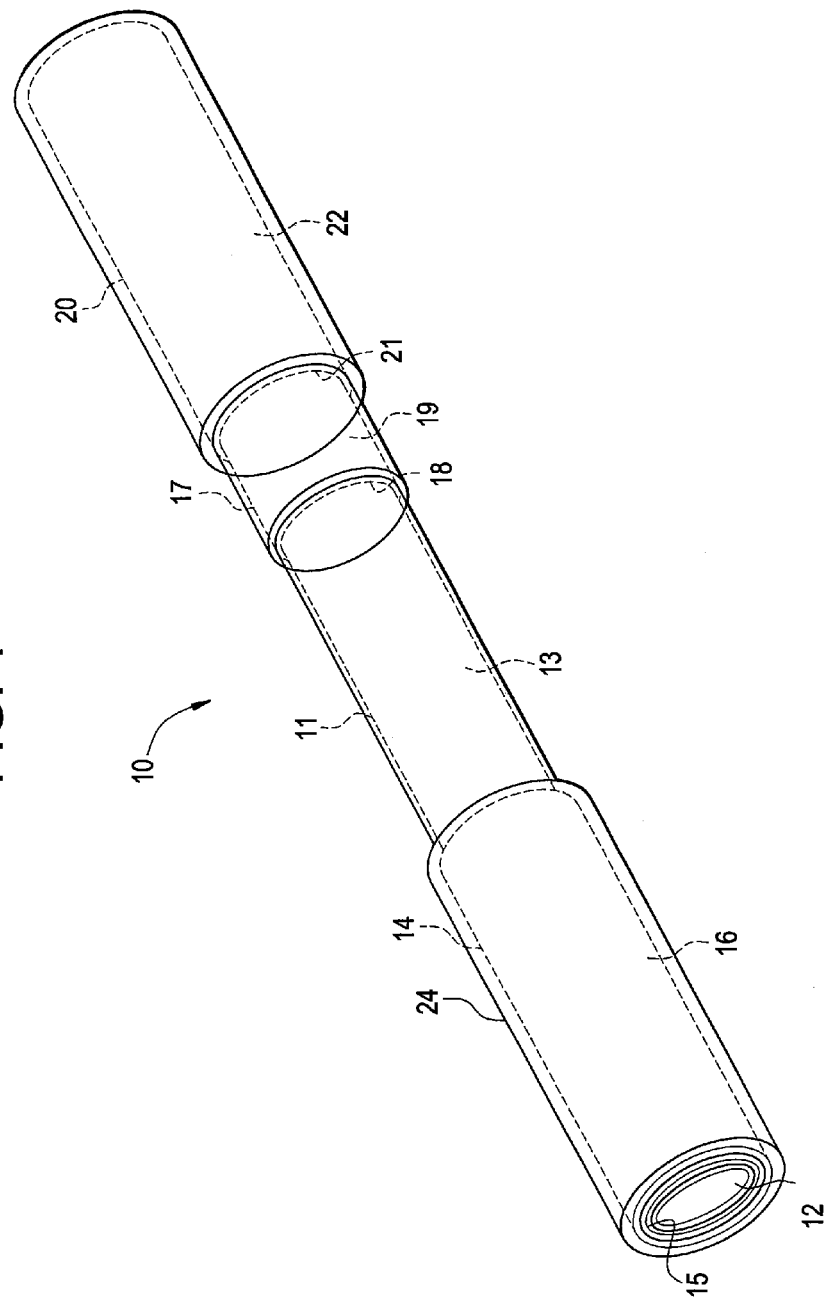

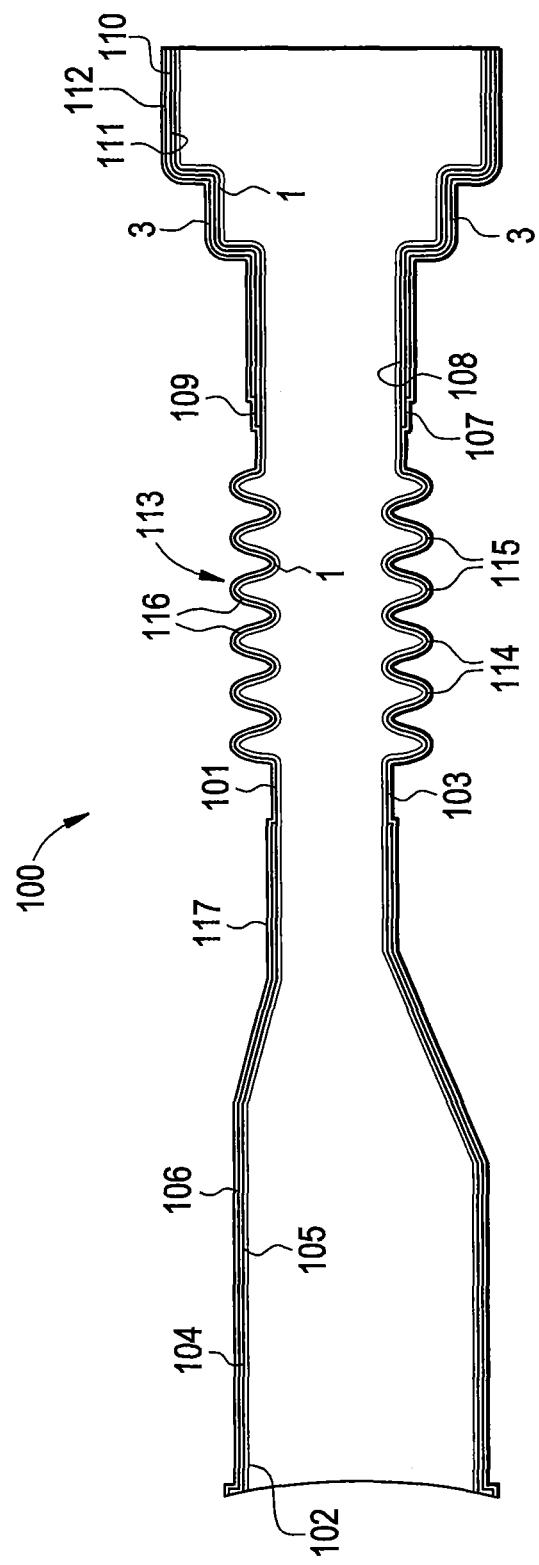

TUBULAR STRUCTURE

RELATED APPLICATIONS

Pursuant to 35 U.S.C. §120, this application claims the benefit and is a continuation of Ser. No. 12/129,738, filed May 30, 2008 which is incorporated by reference in its entirety and which is pending as of the filing date of this application.

BACKGROUND OF THE INVENTION

1. Field of the Invention

The present invention relates generally to tubular structures and, particularly, to fuel filler tubes such as fuel filler tubes for delivering fuel from a fuel filler port to a fuel tank in an automobile and to a method for manufacturing such fuel filler tubular structures.

2. Technical Background and Related Art

Fuel filler tubes are tubular structures extending from a fuel filler port to a fuel storage tank in a vehicle and provide a conduit for delivering fuel from a nozzle designed to deliver fuel from fuel source such as a gas pump to the fuel storage tank. Fuel filler tubes have been constructed from a variety of materials such as metals and polymers in order to prevent permeation of fuel vapor into the atmosphere. Previously, metals, such as steel, were used in the manufacture of fuel filler tubes. Metal fuel filler tubes were effective in preventing initial permeation of fuel vapor, but were highly susceptible to corrosion which led to eventual permeation of fuel through corroded holes or cracks in the fuel filler tube. Polymeric materials are effective to overcome the corrosion problem, but they require multiple layers of specialized polymeric materials and complex formulations in order to reduce permeation of fuel vapor to an acceptable level. Recently, the expense of specialized polymeric materials due to the increasing cost of oil which is the main ingredient in producing polymeric materials, and the increased manufacturing cost of the complex blends and formulations of the polymeric materials, are causing the industry to reevaluate the use of polymeric materials and look to metallic materials such as steels having improved corrosion resistance for the manufacture of fuel filler tubes as well as other fluid and vapor tubes.

In the past, fuel filler tubes made of steel pipe have been coated with a chromium layer and then painted. However, such coated and painted steel fuel filler tubes are not always protected from corrosion, particularly in areas having a high salt environment such as coastal areas and where road salt is used in winter to remove ice from roadways. Additionally, corrosion can also occur inside the fuel filler tube when exposed to a corrosive atmosphere containing denatured gasoline or alcohol-based fuels. Examples of metallic tubes for various uses are found in the following U.S. patent application Publication and in the following U.S. patents:

U.S. Pat. Appln. No. 2005/0280259 A1 to Sausner, et al. describes a multilayer metallic high pressure conduit for a high pressure medium such as used in a fuel injection system in a motor vehicle. The multilayer conduit has a metallic inner layer, one or more metallic intermediate layers and a metallic outer layer. The layers forming the conduit are coaxially fitted into the pressed against one. Each of the inner layer, the one or more intermediate layers and the outer layer are formed of steel, preferably stainless steel, and all of the layers extend the longitudinal length of the conduit.

U.S. Pat. No. 7,048,019 B2 to Pacitto, Jr., et al. teaches a fuel filler assembly including a single layer fuel filler tube formed by cutting a length of tube stock which may be a metal or a polymer. One end of the tube is joined to a funnel insert and the opposite end is joined to a fuel tank. Preferably, the fuel filler tube includes an integrally formed nozzle receptor.

U.S. Pat. No. 6,851,455 B2 to Otsuka, et al. describes a single layer metallic fuel filler tube made of austenitic stainless steel having improved corrosion resistance.

U.S. Pat. No. 6,802,430 B2 to Tomimura, et al. describes a single layer metallic fuel filler tube made from ferritic stainless, which is coated with a corrosion-preventing material such as a cathodic paint or a plating of Al, Zn or Zn alloy containing one or more of Fe, Ni, Co, Mg, Cr, Sn and Al.

U.S. Pat. No. 6,668,455 B2 to Duvall, et al. describes a multi-layer tube having a metal inner tube having a Zn coating such as Zn plating, Zn—Ni alloys, Zn—Co alloys, Zn—Al alloys, and mixtures thereof, and a surface treatment coating bonded to the Zn layer. The Zn layer is a Zn/Al/rare earth alloy, phosphate, chromate or a mixture thereof. One or more polymeric layers form the outer surface of the tube. The invention is concerned with the removal of the one or more polymeric outer layers adjacent the sealing areas of the tube to prevent potential loss of assembly torque over the long term of a vehicle's life, which could occur if the relatively soft polymeric material should extrude out of the sealing area and fitting compression area after assembly.

U.S. Pat. No. 5,620,805 to Ogawa, et al. teaches a multilayer steel tube for boilers, etc. used in installations where fossil fuel or combustible refuse is burnt. The multilayer steel tube has a base steel layer and an inner liner and an outer liner, wherein the inner and outer liners provide corrosion resistance in an environment where fuel containing V, Na, S and Cl is burnt. The inner and outer layers comprise an alloy containing up to 0.05% C, 1.0-2.6% Si, 0.02-0.5% Mn, 20.0-28.0% Cr, 24-36% Ni, up to 4.0% Mo, up to 0.4% Nb, up to 0.05% Al, and the balance Fe.

U.S. Pat. Nos. 5,581,862; 5,390,808; and 5,253,773, all to Choma, et al., disclose a single rolled steel tube which includes a plurality of sections having varying diameters.

U.S. Pat. No. 5,553,640 to Ferenczy, et al. disclose a flat steel band having a copper alloy brazing layer fixedly attached to at least one side of the steel band. The steel band is helically wound and subsequently soldered to form a multilayer tube that is particularly useful for brake line in a motor vehicle.

U.S. Pat. No. 4,185,844 to Hubbard, et al. discloses a single layer aluminum fuel filler tube.

The emergence of new and better steels is one reason for the recent trend towards the use of metals, particularly steel, in the manufacture of fuel filler tubes. Metals such as anti-corrosive steel provide excellent barrier properties against hydrocarbon permeation. Metals also provide high structural integrity. However, there are still obstacles to be overcome in order to rely totally on metal fuel filler tubes. For example, in conventional metallic fuel filler tubes, the assembly typically requires a non-metallic joint in order to achieve a robust connection of the fuel filler tube to the fuel tank. Furthermore, the non-flexibility of metallic fuel filler tubes makes it difficult to employ such metallic fuel filler tubes in today's automotive vehicles because of reduced space constraints.

Accordingly, there is a need in the industry for a fuel filler tube which overcomes the above disadvantages.

SUMMARY OF THE INVENTION

In accordance with the present invention, novel fuel filler tubes and methods of manufacture are provided for conveying fuel from a fuel supply nozzle to a fuel tank in an automotive vehicle, wherein the fuel filler tubes exhibit superior mechanical characteristics as well as reduced fuel-associated emissions. The superior mechanical characteristics of the novel fuel filler tubes allow the fuel filler tubes of the present invention to be employed in applications where the fuel filler tube is required to exhibit high structural rigidity in certain portions of the tube while simultaneously exhibiting improved flexibility in other portions of the tube. For example, the fuel filler tubes of the present invention are highly effective in the automotive industry where the fuel filler tube must be sufficiently rigid enough to withstand the effects of a sudden or unexpected impact, as well as meeting the stringent spatial requirements for installing a fuel filler tube in an automotive vehicle.

More specifically, a tubular structure, a polymeric tubular structure, a method of manufacturing a tubular structure, and a method of manufacturing a polymeric tubular structure are provided.

In an embodiment, the tubular structure has a multi-layer, strength-enhanced first end segment, a multi-layer, strength-enhanced second end segment, and a flexible segment intermediate the multi-layer strength-enhanced first end segment and the multi-layer, strength-enhanced second end segment.

The tubular structure comprises a first inner tubular member having an inner surface and an outer surface. The inner surface provides a passage for conveying fluid therethrough. The first inner tubular member longitudinally extends the entire length of the tubular structure, wherein the first inner tubular member is formed from one or more layers. The tubular structure also comprises a second tubular member circumferentially disposed on the outer surface at a first end of the first inner tubular member. The second tubular member longitudinally extends a predetermined distance on the first inner tubular member forming the multi-layer, strength-enhanced first end segment thereat. A third tubular member is circumferentially disposed on said outer surface at a second end of said first inner tubular member. The third tubular member longitudinally extends a predetermined distance on the first inner tubular member forming the multi-layer, strength-enhanced second end segment thereat. The second tubular member and said third tubular member are spaced apart on said first inner tubular member such that said second tubular member and said third tubular member are not contiguous with one another. At least one of the first inner tubular member, the second tubular member, and the third tubular member is metallic and at least one of the first inner tubular member, the second tubular member, and the third tubular member is polymeric.

In another embodiment, the tubular structure is polymeric. The polymeric tubular structure has a multi-layer, strength-enhanced first end segment, a multi-layer, strength-enhanced second end segment, and a flexible segment intermediate said multi-layer strength-enhanced first end segment and said multi-layer, strength-enhanced second end segment.

The polymeric tubular structure comprises a first inner polymeric tubular member having an inner surface and an outer surface. The inner surface provides a passage for conveying fluid therethrough. The first inner polymeric tubular member longitudinally extends the entire length of said polymeric tubular structure, wherein the first inner polymeric tubular member is formed from one or more polymeric layers. The polymeric tubular structure also comprises a second polymeric tubular member circumferentially disposed on said outer surface at a first end of said first inner polymeric tubular member. The second polymeric tubular member longitudinally extends a predetermined distance on the first inner polymeric tubular member forming said multi-layer, strength-enhanced first end segment thereat. A third polymeric tubular member is circumferentially disposed on the outer surface at a second end of the first inner polymeric tubular member. The third polymeric tubular member longitudinally extends a predetermined distance on the first inner polymeric tubular member forming the multi-layer, strength-enhanced second end segment thereat. The second polymeric tubular member and the third polymeric tubular member are spaced apart on the first inner polymeric tubular member such that the second polymeric tubular member and the third polymeric tubular member are not contiguous with one another.

BRIEF DESCRIPTION OF THE DRAWINGS

FIG. 1 is a partially cutaway perspective view illustrating the arrangement of the layers forming a multi-layer fuel filler hose of the invention; and FIG. 2 is a side view illustrating the arrangement of the layers forming a multi-layer fuel filler hose having corrugation therein in accordance with a preferred aspect of the invention.

DETAILED DESCRIPTION OF THE PREFERRED EMBODIMENTS

A fuel filler tube having a plurality of metallic members at specified locations along the longitudinal axis of the fuel filler tube, and a single layer of a metallic member at a specified location along the longitudinal axis of the fuel filler tube exhibits improved structural characteristics not realized by conventional fuel filler tubes. More particularly, the fuel filler tube of the present invention includes a plurality of metallic members (or layers) at specified locations along the longitudinal axis of the fuel filler tube which imparts significantly greater structural strength to the fuel filler tube while a corrugated or convoluted section in a single metallic layer imparts improved flexibility of the fuel filler tube.

As illustrated in FIG. 1, a tubular structure 10 of the present invention includes an inner metallic tubular member 11 having an inner surface 12 and an outer surface 13, a second metallic tubular member 14 having an inner surface 15 and an outer surface 16 disposed on the outer surface 13 of the inner metallic tubular member 11, a third metallic tubular member 17 having an inner surface 18 and an outer surface 19 disposed on the outer surface 13 of the inner metallic tubular member 11, and a fourth metallic tubular member 20 having an inner surface 21 and an outer surface 22 disposed on the outer surface 19 of the third metallic member 17. A protective cover 24 may be formed on the outer surface of the tubular structure 10.

As illustrated in FIG. 2, a preferred fuel filler tube 100 of the present invention includes an inner metallic tubular member 101 having an inner surface 102 and an outer surface 103, a second metallic tubular member 104 having an inner surface 105 and an outer surface 106 disposed on the outer surface 103 of the inner metallic tubular member 101, a third metallic tubular member 107 having an inner surface 108 and an outer surface 109 disposed on the outer surface 103 of the inner metallic tubular member 101, a fourth metallic tubular member 110 having an inner surface 111 and an outer surface 112 disposed on the outer surface 109 of the third metallic member 107, a corrugated or convoluted structure 113 having alternating crests 114 and valleys 115 interconnected by shallow angled side walls 116. The multi-layer metallic tubular members provide a substantially improved structural strength to the fuel filler tube while the corrugations or convolutions provide flexibility to the fuel filler tube so that the fuel filler tube can be easily shaped into any desirable configuration. In certain applications, an outer protective cover 117 may be desired to protect the fuel filler tube 100 from environmental hazards or provide further corrosion protection. Typically, such protective cover is a polymeric material circumferentially disposed on the outer surface of the tubular structure. The polymeric protective cover is formed from any of the materials known in the art for such purpose. For example, such protective covers are typically formed from polymeric materials such as styrene-butadiene rubber (SBR), butadiene-nitrile rubber (NBR), chlorinated polyethylene (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers (EPDM), ethylene-propylene-diene terpolymers, ultra high molecular weight polyethylene, high density polyethylene, ethylene-acrylic, polyacrylic, polyamide, and blends thereof.

The fuel filler tube of the invention includes a first inner member having an inner surface and an outer surface. The length of the first inner member is such that the first inner member extends the entire length of the fuel filler tube with the inner surface of the first inner member forming the entire inner surface of the fuel filler tube. A second tubular member and a third tubular member, each having a length shorter than the first inner tubular member, is formed on a first end portion and a second end portion, respectively, of the first tubular member such that each of the second tubular member and the third tubular member extends a predetermined distance from the first end and the second end, respectively, of the inner tubular member to provide first and second multi-layer segments having improved structural strength. The first end of the fuel filler tube is defined as having a funnel-like shape designed to sealably connect to a fuel inlet port on the automotive vehicle. Typically, a fourth tubular member is formed on at least a portion of the third tubular member to provide further structural strength to the second end of the fuel filler tube which is designed to sealably connect with a fuel tank as discussed below. The outer surfaces of the first metallic tubular member, the second metallic tubular member and the third metallic tubular member form a two-step outer surface of the fuel filler tube. The outer surfaces of the fourth tubular member, the first tubular member and the third tubular member form a three-step outer surface of the fuel filler tube.

In order to meet the stringent permeability requirement imposed by Federal and State regulations and to provide structural stability under adverse conditions for long periods of time, the tubular members of the present invention are formed from a metallic material capable of meeting the above permeability requirements while providing the necessary structural stability. In accordance with the present invention, the metallic materials are those having sufficient structural strength and fuel permeation resistance. Representative metallic materials include steel, stainless steel, hot rolled steel, alloys of steel with other suitable metals, aluminum, etc. The preferred metallic materials are any of the metals recognized in the art as having enhanced corrosion resistance and improve structural characteristics. Most preferably, the metal is steel having superior corrosion resistance while providing the necessary structural integrity to perform as a fuel filler tube in a harsh environment for long periods of time. The metals may be of similar or dissimilar grades and the metal forming any one of the various members may be the same metal used in the other metal tubular members. Furthermore, any of the various layers may be constructed from one or more individual layers of the acceptable metal(s). The choice of metals is determined by numerous considerations such as cost, suitability in specific locations, etc.

The thickness of the various metallic tubular members is determined by the particular metal employed, the placement of the specific metallic tubular member incorporated in the fuel filler tube and the structural demands placed on the particular metallic tubular member. Typically, the thickness of the layers used to form the metallic fuel filler tube of the invention should be no more than that necessary to provide the required structural strength and fuel impermeability to the metallic fuel filler tube of the invention while allowing the fuel filler tube to function in a desired manner without providing undue weight to the tubular structure. While the above discussion has been directed to specific metallic tubular members, such metallic tubular members are not to be limited to only those specific metallic tubular members described, but may include other metallic tubular members having the same or different thickness in other segments of the fuel filler tube to provide one or more desired characteristics.

Preferably, the first metallic tubular member intermediate the second and third metallic tubular members, being free of any additional metallic tubular member, is configured to provide flexibility to the fuel filler tube. By adding multiple metallic tubular layers at one or more locations of the fuel filler tube, greater structural strength can be achieved while, at the other locations containing a less number of metallic tubular layers, features such as corrugations may be formed to provide flexibility to the fuel filler tube.

The corrugated or convoluted segment of the first metallic tubular member exhibits any configuration commonly known in the art to provide flexibility to the fuel filler tube. Typically, the corrugation or convolution segment includes a plurality of alternating crests and valleys interconnected by shallow angled side walls. The corrugations or convolutions provide a certain amount of flexibility to the fuel filler tube so that it can be easily bent and shaped to fit into a confined space. While the metallic fuel filler tube is shown to include one corrugated or convoluted segment, it is to be understood that additional corrugated or convoluted segments may be employed depending on the number of bends necessary to meet the space requirements for the metallic fuel filler tube. In addition, the metallic fuel filler tube of the invention may include other features capable of enhancing the characteristics of the metallic fuel filler tube. For example, strengthening ribs and cathedral bends may be utilized to provide their desirable features.

The metallic fuel filler tube typically exhibits a funnel-shaped end that is sealably connected to the fuel inlet port, by any conventional means known in the art, for accepting a fuel nozzle in supplying fuel through the metallic fuel filler tube to the fuel tank. The multi-layer funnel-shaped end of the inventive multi-layer fuel filler tube is uniquely distinct from current single metallic layer tubes.

At the opposite end from the funnel-shaped connection, the metallic fuel filler tube is connected to the fuel tank by an assembly commonly known in the art such as a male/female quick connect/release housing, or is end-formed for hose joint to provide a substantially greater structural strength than conventional connections. A particular advantage of the fuel filler tube of the present invention is that no weld joints are required in forming the fuel filler tube or in connecting the fuel filler tube to the fuel tank of an automotive vehicle.

A method for forming the metallic fuel filler tube of the present invention is also described wherein the inner most metallic member is one continuous tube and the additional layers are sleeved over the continuous inner tubular member. Each additional layer is formed to an interference fit. Typically, the forming process would be performed through mechanical and/or hydroform expansion and/or reduction of the appropriate tubular members after formation of the metallic fuel filler tube, although, it is within the concept of the invention to form the various layers during construction of the metallic fuel filler tube.

The invention has been defined as a metallic tubular structure and, preferably, as a metallic fuel filler tube for use in automotive applications. However, the use of polymeric materials such as those commonly used in the manufacture of various automotive tubes and hoses or a combination of metallic layers and polymeric layers can be employed instead of the metallic materials in forming the unique tubular structures of the present invention. Furthermore, the tubular structures described herein can be employed in any application requiring substantially greater structural strength as well as sufficient flexibility to allow the tube to be shaped for use in a confined space having one or more configurations.

Having described the invention in detail and illustrated such invention in the drawings, it will be apparent that modifications and variations are possible without departing for the scope and spirit of the invention as defined by the appended claims.

What is claimed is:

1. A polymeric tubular structure having a multi-layer, strength-enhanced first end segment, a multi-layer, strength-enhanced second end segment, and a flexible segment intermediate said multi-layer strength-enhanced first end segment and said multi-layer, strength-enhanced second end segment, said polymeric tubular structure comprising:
    a first inner polymeric tubular member having an inner surface and an outer surface, said inner surface providing a passage for conveying fluid therethrough, said first inner polymeric tubular member longitudinally extending the entire length of said polymeric tubular structure, wherein said first inner polymeric tubular member is formed from one or more polymeric layers;
    a second polymeric tubular member circumferentially disposed on said outer surface at a first end of said first inner polymeric tubular member, said second polymeric tubular member longitudinally extending a predetermined distance on said first inner polymeric tubular member forming said multi-layer, strength-enhanced first end segment thereat; and
    a third polymeric tubular member circumferentially disposed on said outer surface at a second end of said first inner polymeric tubular member, said third polymeric tubular member longitudinally extending a predetermined distance on said first inner polymeric tubular member forming said multi-layer, strength-enhanced second end segment thereat, wherein said second polymeric tubular member and said third polymeric tubular member are spaced apart on said first inner polymeric tubular member such that said second polymeric tubular member and said third polymeric tubular member are not contiguous with one another.

2. The polymeric tubular structure of claim 1, further comprising a fourth polymeric tubular member circumferentially disposed on said third polymeric tubular member, wherein said fourth polymeric tubular member longitudinally extends a predetermined distance on said third polymeric tubular member forming a third multi-layer segment thereat.

3. The polymeric tubular structure of claim 1 wherein said multi-layer, polymeric tubular structure is a fuel filler tube configured to reside between an automotive fuel inlet port and an automotive fuel tank.

4. The polymeric tubular structure of claim 1 wherein said flexible segment is configured as one or more corrugated sections.

5. The polymeric tubular structure of claim 3 wherein said first multi-layer, strength-enhanced end is configured to sealably join with said automotive fuel inlet port and said multi-layer, strength-enhanced second end is configured to sealably join with said automotive fuel tank.

6. The polymeric tubular structure of claim 1 further comprising a corrosion-inhibiting protective cover layer surrounding the outer surface of said polymeric tubular structure.

7. The polymeric tubular structure of claim 6 wherein said corrosion-inhibiting protective cover is a polymeric material selected from the group consisting of styrene-butadiene rubber (SBR), butadiene-nitrile rubber (NBR), chlorinated polyethylene (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers, ethylene-propylene-diene terpolymers (EPDM), ultra high molecular weight polyethylene, high density polyethylene, ethylene-acrylic, polyacrylic, polyamide, and blends thereof.

8. A polymeric fuel filler tube, said polymeric fuel filler tube having an inner surface providing a passage for conveying fluid, an outer surface, a multi-layer, strength-enhanced first end segment, a multi-layer, strength-enhanced second end segment, and a flexible segment intermediate said multi-layer, strength-enhanced first end segment and said multi-layer, strength-enhanced second end segment, said polymeric tubular structure comprising:
    a first polymeric inner tubular member comprising one or more polymeric layers, said first polymeric inner tubular member having a continuous length longitudinally extending the entire length of said polymeric fuel filler tube;
    a second polymeric tubular member circumferentially disposed on said first polymeric inner tubular member, wherein said second polymeric tubular member has a length less than said continuous length of said first inner polymeric tubular member, said second polymeric tubular member longitudinally extending a predetermined distance on said first polymeric inner tubular member forming a first multi-layer, strength-enhancing segment thereat;
    a third polymeric tubular member circumferentially disposed on said first inner polymeric tubular member, wherein said third polymeric tubular member has a length less than said continuous length of said first inner polymeric tubular member, said third polymeric tubular member longitudinally extending a predetermined distance on said first polymeric inner tubular member forming a second multi-layer, strength-enhancing segment thereat; and
    a fourth polymeric tubular member circumferentially disposed on said third polymeric tubular member, wherein said fourth polymeric tubular member has a length less than said length of said third polymeric tubular member, said fourth polymeric tubular member longitudinally extending a predetermined distance on said third polymeric tubular member forming a third multi-layer segment thereat, wherein said second polymeric tubular member and said third polymeric tubular member are spaced apart on said outer surface of said first polymeric inner tubular member and said second polymeric tubular member and said third polymeric tubular member are not contiguous with one another.

9. The polymeric fuel filler tube of claim 8 further comprising a corrosion-inhibiting protective cover layer circumferentially surrounding the outer surface of said steel tubular structure.

10. The polymeric fuel filler tube of claim 9 wherein said corrosion-inhibiting protective cover is a polymeric material selected from the group consisting of styrene-butadiene rubber (SBR), butadiene-nitrile rubber (NBR), chlorinated polyethylene, (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers, ethylene-propylene-diene terpolymers (EPDM), ultra high molecular weight polyethylene, high density polyethylene, ethylene-acrylic, polyacrylic, polyamide, and blends thereof.

11. The polymeric fuel filler tube of claim 10 wherein said flexible segment is configured as one or more corrugated sections.

12. A method of manufacturing a polymeric tubular structure for conveying fluid or vapor, said method comprising the steps of:
providing a first inner polymeric tubular member having a predetermined continuous length extending from a first end thereof to a second end thereof, wherein said first inner polymeric tubular member is formed from one or more polymeric layers;
providing a second polymeric tubular member having a predetermined continuous length less than said predetermined continuous length of said first inner polymeric tubular member;
providing a third polymeric tubular member having a predetermined continuous length less than said predetermined continuous length of said first inner polymeric tubular member;
circumferentially mounting said second polymeric tubular member on a first end of said first inner polymeric tubular member such that said second polymeric tubular member circumferentially extends from said first end forming a first multi-layer, strength-enhanced segment thereat;
circumferentially mounting said third polymeric tubular member on a second end of said first inner polymeric tubular member such that said third polymeric tubular member circumferentially extends from said second end forming a second multi-layer, strength-enhanced segment thereat;
forming a flexible segment in said first inner polymeric tubular member intermediate said second polymeric tubular member and said third polymeric tubular member.

13. The method of claim 12 wherein said step of forming said flexible segment comprises forming one or more corrugated sections in said first polymeric tubular member at a predetermined location intermediate said first end and said second end after forming said polymeric tubular structure.

14. The method of claim 13 further comprising the step of providing a protective cover layer on the entire outer surface of said multi-layer polymeric tube, wherein said protective cover is a polymeric material selected from the group consisting of styrene-butadiene rubber (SBR), butadiene-nitrile rubber (NBR), chlorinated polyethylene (CPE), chlorosulfonated polyethylene (CSM), vinylidene-acrylic rubber, acrylic rubber, epichlorohydrin rubber, ethylene-carbon monoxide copolymers (ECO), polychloroprene rubber, polyvinyl chloride (PVC), ethylene-propylene copolymers, ethylene-propylene-diene terpolymers, ultra high molecular weight polyethylene, high density polyethylene, ethylene-acrylic, polyacrylic, polyamide, and blends thereof.

15. A tubular structure having a multi-layer, strength-enhanced first end segment, a multi-layer, strength-enhanced second end segment, and a flexible segment intermediate said multi-layer strength-enhanced first end segment and said multi-layer, strength-enhanced second end segment, said tubular structure comprising:
a first inner tubular member having an inner surface and an outer surface, said inner surface providing a passage for conveying fluid therethrough, said first inner tubular member longitudinally extending the entire length of said tubular structure, wherein said first inner tubular member is formed from one or more layers;
a second tubular member circumferentially disposed on said outer surface at a first end of said first inner tubular member, said second tubular member longitudinally extending a predetermined distance on said first inner tubular member forming said multi-layer, strength-enhanced first end segment thereat; and
a third tubular member circumferentially disposed on said outer surface at a second end of said first inner tubular member, said third tubular member longitudinally extending a predetermined distance on said first inner tubular member forming said multi-layer, strength-enhanced second end segment thereat, wherein said second tubular member and said third tubular member are spaced apart on said first inner tubular member such that said second tubular member and said third tubular member are not contiguous with one another;
wherein at least one of said first inner tubular member, said second tubular member, and said third tubular member is metallic and at least one of said first inner tubular member, said second tubular member, and said third tubular member is polymeric.

16. The tubular structure of claim 15, further comprising a fourth tubular member circumferentially disposed on said third tubular member, wherein said fourth tubular member longitudinally extends a predetermined distance on said third tubular member forming a third multi-layer segment thereat and wherein said fourth tubular member is metallic or polymeric.

17. A method of manufacturing a tubular structure for conveying fluid or vapor, said method comprising the steps of:
providing a first inner tubular member having a predetermined continuous length extending from a first end thereof to a second end thereof, wherein said first inner tubular member is formed from one or more metallic or polymeric layers;
providing a second tubular member having a predetermined continuous length less than said predetermined continuous length of said first inner tubular member, wherein said second tubular member is metallic or polymeric;
providing a third tubular member having a predetermined continuous length less than said predetermined continuous length of said first inner tubular member, wherein said third tubular member is metallic or polymeric;
circumferentially mounting said second tubular member on a first end of said first inner tubular member such that said second tubular member circumferentially extends from said first end forming a first multi-layer, strength-enhanced segment thereat;
circumferentially mounting said third tubular member on a second end of said first inner tubular member such that said third tubular member circumferentially extends from said second end forming a second multi-layer, strength-enhanced segment thereat;

forming a flexible segment in said first inner tubular member intermediate said second tubular member and said third tubular member.

18. The method of claim 17 wherein said step of forming said flexible segment comprises forming one or more corrugated sections in said first inner tubular member at a predetermined location intermediate said first end and said second end after forming said tubular structure.

* * * * *